United States Patent
Park et al.

(10) Patent No.: US 11,749,816 B2
(45) Date of Patent: Sep. 5, 2023

(54) HIGHLY DURABLE ELECTROLYTE MEMBRANE HAVING IMPROVED ION CONDUCTIVITY AND PRODUCTION METHOD THEREFOR

(71) Applicants: Hyundai Motor Company, Seoul (KR); Kia Corporation, Seoul (KR)

(72) Inventors: In Yu Park, Seoul (KR); Byoung Su Kim, Gyeonggi-do (KR); Dae Yong Son, Seoul (KR); Jong Kil Oh, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/537,165

(22) Filed: Nov. 29, 2021

(65) Prior Publication Data
US 2022/0209259 A1 Jun. 30, 2022

(30) Foreign Application Priority Data
Dec. 31, 2020 (KR) .......... 10-2020-0188686

(51) Int. Cl.
*H01M 8/0293* (2016.01)
*H01M 8/1004* (2016.01)
*C25B 9/23* (2021.01)
*C25B 1/04* (2021.01)

(52) U.S. Cl.
CPC ............ *H01M 8/0293* (2013.01); *C25B 9/23* (2021.01); *H01M 8/1004* (2013.01); *C25B 1/04* (2013.01)

(58) Field of Classification Search
CPC .................................... H01M 8/0293
See application file for complete search history.

(56) References Cited

U.S. PATENT DOCUMENTS 9,847,533 B2   12/2017  Berta et al.
2021/0242480 A1*  8/2021  Park .................. C25B 13/08

FOREIGN PATENT DOCUMENTS

KR    2008-0047574 A    5/2008

OTHER PUBLICATIONS

Aoki, Makoto, Decomposition mechanism of perflourosulfonic acid electrolyte in polymer electrolyte fuel cells, Science Direct (Year: 2006).*
D. E. Curtin et al., J. Power Sources, 131, 41-48 (2004).
A. P. Young et al., J. Electrochem. Soc., 157, B425-B436 (2010).
P. Trogadas et al., Electrochem. Solid-State Lett., 11, B113-B116 (2008).
R. Uegaki et al., J. Power Sources, 196, 9856-9861 (2011).
D. Zhao et al., J. Power Sources, 190, 301-306 (2009).
E. Endoh, ECS Trans., 16, 1229-1240 (2008).
D. Banham et al., J. Electrochem. Soc., 161, F1075-F1080 (2014).
(Continued)

*Primary Examiner* — Brian R Ohara
(74) *Attorney, Agent, or Firm* — Fox Rothschild LLP

(57) ABSTRACT

Disclosed are a highly durable electrolyte membrane having improved ion conductivity and a method of producing the same. The electrolyte membrane may include an ionomer having hydrogen ion conductivity and a complex dispersed in the ionomer. The complex may include: a support; a primary antioxidant loaded on the support and having radical scavenging ability; and a secondary antioxidant loaded on the support and having peroxide decomposition activity.

18 Claims, 3 Drawing Sheets

(56) References Cited

OTHER PUBLICATIONS

Y. Zhu et al., J. Membr. Sci., 432, 66-72 (2013).
M. A. Hasan et al., Appl. Catal. A: General, 181, 171-179 (1999).
D. Zhao et al., J. Membr. Sci., 346, 143-151 (2010).
L. Gubler and W. H. Koppenol, J. Electrochem. Soc., 159, B211-B218 (2012).
M. Aoki et al et al., Electrochem. Commun. 8, 1509-1513 (2006).
M. Watanabe et al., J. Electrochem. Soc., 145, 1137-1141 (1998).
D. Zhao et al., J. Power Sources, 195, 4606-4612 (2010).
V. Atrazhev et al., ECS Transactions, 1(8) 239-246 (2006).

* cited by examiner

HIGHLY DURABLE ELECTROLYTE MEMBRANE HAVING IMPROVED ION CONDUCTIVITY AND PRODUCTION METHOD THEREFOR

CROSS-REFERENCE TO RELATED APPLICATION

This application claims under 35 U.S.C. § 119(a) the benefit of priority to Korean Patent Application No. 10-2020-0188686 filed on Dec. 31, 2020, the entire contents of which are incorporated herein by reference.

TECHNICAL FIELD

The present invention relates to a highly durable electrolyte membrane having improved ion conductivity and a production method therefor.

BACKGROUND

In general, a polymer electrolyte membrane fuel cell (PEMFC) is applied as an automotive fuel cell. In order for the polymer electrolyte membrane fuel cell to normally exhibit high power performance of at least several tens of kW under various driving conditions of automobiles, the polymer electrolyte membrane fuel cell should be capable of stably operating in a wide current density range. The reaction for generating electricity in the fuel cell occurs in a membrane-electrode assembly (MEA) composed of a perfluorinated sulfonic acid (PFSA) ionomer-based electrolyte membrane and anode and cathode electrodes. After the hydrogen supplied to the oxidation electrode (anode) of the fuel cell is separated into hydrogen ions (protons) and electrons, the hydrogen ions move toward the reduction electrode (cathode) through the membrane, and the electrons move to the cathode through an external circuit. In the cathode, oxygen molecules, hydrogen ions and electrons react together to produce electricity while producing water ($H_2O$) and heat as reaction by-products.

In general, hydrogen and atmospheric oxygen, which are reactant gases for the fuel cell, crossover through the electrolyte membrane and promote the formation of hydrogen peroxide (HOOH), and this hydrogen peroxide produces oxygen-containing radicals such as hydroxyl radicals (.OH) and hydroperoxyl radicals (.OOH). These radicals attack the perfluorinated sulfonic acid-based electrolyte membrane, causing chemical degradation of the membrane, and consequently have a negative effect of reducing the durability of the fuel cell.

As conventional technology for mitigating this chemical degradation of the electrolyte membrane, a method of adding various types of antioxidants to the electrolyte membrane has been proposed. As such antioxidants, a primary antioxidant, which functions as a radical scavenger or quencher, and a secondary antioxidant which functions as a hydrogen peroxide decomposer, may be used alone or in combination. Representative primary antioxidants that are used in perfluorinated sulfonic acid-based electrolyte membranes for polymer electrolyte membrane fuel cells include cerium-based antioxidants, such as cerium oxide (or ceria) and cerium (III) nitrate hexahydrate, terephthalate-based antioxidants, and the like. The cerium oxide may be broadly classified into pure cerium oxide ($CeO_2$) and modified cerium oxide (modified $CeO_2$). Examples of the modified cerium oxide include cerium-zirconium oxide ($CeZrO_x$), cerium-manganese oxide ($CeMnO_x$), cerium oxide-doped silica, cerium oxide-doped yttrium oxide, and cerium oxide-doped zirconium oxide.

In addition, representative secondary antioxidants that are used in perfluorinated sulfonic acid (PFSA)-based electrolyte membranes include manganese-based antioxidants such as manganese oxide, and transition metal catalysts such as platinum (Pt).

In order to increase the chemical durability of electrolyte membranes for fuel cells, various studies on electrolyte membranes containing platinum have been conducted. According to the results of studies conducted to date, the durability of the electrolyte membrane may be improved or decreased depending on the amount, degree of distribution, and microstructure of platinum introduced into the electrolyte membrane. For example, as a positive effect, platinum introduced into the electrolyte membrane converts crossover hydrogen and oxygen gases into water before these gases reach the electrode, thereby increasing the amount of water in the electrolyte membrane and increasing the proton conductivity of the membrane, ultimately resulting in improvement in the performance of the membrane-electrode assembly. In addition, platinum introduced into the electrolyte membrane may have a positive effect of improving the chemical durability of the electrolyte membrane by blocking the production of radicals themselves through blocking of crossover hydrogen and oxygen gases or decomposing hydrogen peroxide produced in the electrolyte membrane. On the other hand, as a negative effect, platinum introduced into the electrolyte membrane may convert hydrogen peroxide into radicals or convert crossover oxygen gas directly into radicals, resulting in a decrease in the durability of the electrolyte membrane.

When platinum is used in the electrolyte membrane as described above, platinum is generally added in a form loaded on a support or supporting material in order to increase the degree of dispersion of platinum, and the amount of platinum added is increased in order to further improve the chemical durability of the electrolyte membrane. In this case, if an excessively large amount of platinum is added, it may increase the risk of causing an electrical short in the electrolyte membrane, due to the high electrical conductivities of platinum and carbon. As another method, a radical scavenger may be added to the electrolyte membrane to improve the chemical durability of the electrolyte membrane. However, when the radical scavenger is added thereto, the hydrogen ion conductivity of the electrolyte membrane tends to decrease.

SUMMARY

In preferred aspects, provided is an electrolyte membrane having excellent antioxidant properties and high hydrogen ion conductivity.

In an aspect, provided is an electrolyte membrane for a membrane-electrode assembly, which may include: an ionomer having hydrogen ion conductivity; and a complex dispersed in the ionomer. The complex may include: a support; a primary antioxidant loaded on the support and having radical scavenging ability; and a secondary antioxidant loaded on the support and having hydrogen peroxide decomposition activity.

The term "ionomer" as used herein refers to a polymeric material or resin that includes ionized groups attached (e.g. covalently bonded) to the backbone of the polymer as pendant groups. Preferably, such ionized groups may be functionalized to have ionic characteristics, e.g., hydrogen ion conductivity.

The ionomer may suitably include one or more polymers selected from the group consisting of a fluoro-based polymer, a perfluorosulfone-based polymer, a benzimidazole-based polymer, a polyimide-based polymer, a polyetherimide-based polymer, a polyphenylene sulfide-based polymer, a polysulfone-based polymer, a polyethersulfone-based polymer, a polyetherketone-based polymer, a polyetheretherketone-based polymer, a polyphenylquinoxaline-based polymer and a polystyrene-based polymer.

The support may include one or more of titanium nitride and titanium oxide.

The support may include titanium nitride in an inner portion thereof, and may include titanium oxide on at least a portion of the surface thereof.

The support may have an X-ray diffraction (XRD) pattern in which a peak attributable to titanium nitride, a peak attributable to a titanium oxide having an anatase crystal structure, and a peak attributable to a titanium oxide having a rutile crystal structure are found.

The primary antioxidant may include one or more of cerium-based oxides and manganese-based oxides.

The content of the primary antioxidant may be about 3 $\mu g/cm^2$ to 35 $\mu g/cm^2$.

The secondary antioxidant may include one or more selected from the group consisting of platinum (Pt), osmium (Os), iridium (Ir), gold (Au), palladium (Pd), silver (Ag), copper (Cu), nickel (Ni), cobalt (Co), titanium (Ti), and iron (Fe).

The secondary antioxidant may have a crystal size of about 5 nm to 20 nm.

The density of the secondary antioxidant may be about 2 $\mu g/cm^3$ to 4 $\mu g/cm^3$.

The electrolyte membrane may further include a composite membrane including a reinforcing layer and an ion transport material impregnated in the reinforcing layer, wherein an ion transport layer formed on at least one surface of the composite membrane may include the ionomer and the complex.

In an aspect, provided is a method for producing an electrolyte membrane, may include steps of: loading a secondary antioxidant having hydrogen peroxide decomposition activity on a support; obtaining a complex by loading a primary antioxidant having radical scavenging ability on the support having the secondary antioxidant loaded thereon; and producing an electrolyte membrane by applying a mixture obtained by dispersing the complex in an ionomer.

The support may include titanium nitride, and before the primary antioxidant is loaded, the support having the secondary antioxidant loaded thereon may be oxidized by drying in an air atmosphere.

The oxidized support may include titanium nitride in an inner portion thereof, and may include titanium oxide on at least a portion of the surface thereof.

The drying may be performed at a temperature of about 60° C. to 100° C.

The drying may be performed for up to about 60 minutes from the time point when the secondary antioxidant reacts with atmospheric air.

Also provided is an ion transport layer which may be formed by applying the mixture to at least one surface of a composite membrane including a reinforcing layer and an ion transport material impregnated in the reinforcing layer.

Other aspects of the invention are disclosed infra.

BRIEF DESCRIPTION OF THE DRAWINGS

The above and other features of the present invention will now be described in detail with reference to certain exemplary examples thereof illustrated in the accompanying drawings which are given herein below by way of illustration only, and thus are not limitative of the present invention, and wherein.

DETAILED DESCRIPTION

Figure 1:
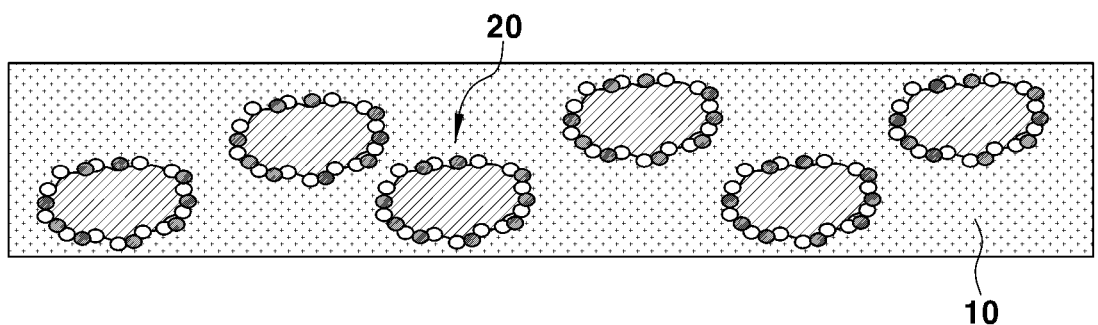
FIG. 1 shows an electrolyte membrane for an exemplary membrane-electrode assembly according to an exemplary embodiment of the present invention.

The above objects, other objects, features and advantages of the present invention will become apparent with reference to the embodiments described below in conjunction with the accompanying drawings. However, the present invention is not limited to the embodiments disclosed below and may be embodied in a variety of different forms. Rather, these embodiments disclosed herein are provided so that this invention will be thorough and complete, and will fully convey the spirit of the present invention to those skilled in the art.

Throughout the specification and the accompanying drawings, like reference numerals refer to like components. In the accompanying drawings, the dimensions of structures are exaggerated for clarity of illustration. Although terms such as "first" and "second" may be used to describe various components, the components should not be limited by these terms. These terms are used only to distinguish one component from another component. For example, a first component may be termed a second component without departing from the scope of the present invention, and similarly, a second component may also be termed a first component. Singular expressions include plural expressions unless the context clearly indicates otherwise.

In the present specification, it should be understood that terms such as "include" and "have" are intended to denote the existence of mentioned characteristics, numbers, steps, operations, components, parts, or combinations thereof, but do not exclude the probability of existence or addition of one or more other characteristics, numbers, steps, operations, components, parts, or combinations thereof. In addition, when a part, such as a layer, film, region, plate, or the like, is referred to as being "on" or "above" another part, it not only refers to a case where the part is directly above the other part, but also a case where a third part exists therebetween. Conversely, when a part, such as a layer, film, region, plate, or the like, is referred to as being "below" another part, it not only refers to a case where the part is directly below the other part, but also a case where a third part exists therebetween.

Since all numbers, values and/or expressions referring to quantities of components, reaction conditions, polymer compositions, and mixtures used in the present specification are subject to various uncertainties of measurement encountered in obtaining such values, unless otherwise indicated, all are to be understood as modified in all instances by the term "about." Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Where a numerical range is disclosed herein, such a range is continuous, inclusive of both the minimum and maximum values of the range as well as every value between such minimum and maximum values, unless otherwise indicated. Still further, where such a range refers to integers, every integer between the minimum and maximum values of such a range is included, unless otherwise indicated. When a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

FIG. 1 is a sectional view showing an exemplary electrolyte membrane for a membrane-electrode assembly according to an exemplary embodiment of the present invention. The electrolyte membrane may include an ionomer 10 and a complex 20 dispersed in the ionomer 10.

The ionomer 10 may serve as a kind of substrate forming the framework of the electrolyte membrane.

The ionomer 10 may include a material having hydrogen ion conductivity. Accordingly, hydrogen ions may move between a pair of electrodes formed on both sides of the electrolyte membrane. Although the type of the ionomer 10 is not particularly limited, the ionomer 10 may include, for example, a perfluorinated sulfonic acid-based polymer such as Nafion.

Figure 2:
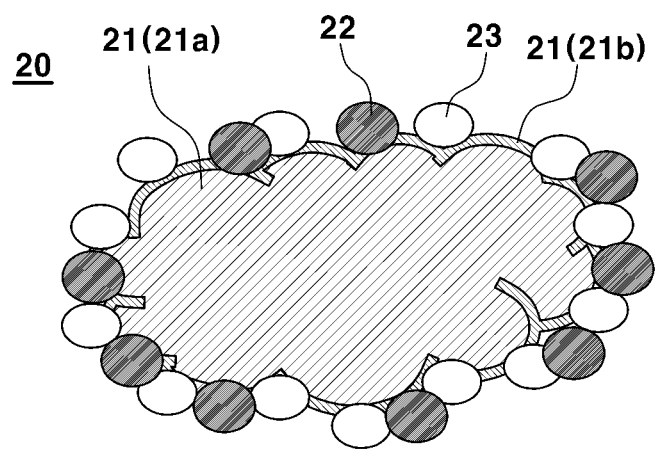
FIG. 2 is a sectional view showing a complex included an exemplary electrolyte membrane according to an exemplary embodiment of the present invention.

FIG. 2 is a sectional view showing the complex 20. The complex 20 includes a support 21, and a primary antioxidant 22 and a secondary antioxidant 23, which are loaded on the support 21.

The support 21 may include a non-conductive material. As used herein, the term "non-conductive material" means a material having no electrical conductivity or having an electrical conductivity that does not affect the electrical conductivity of the electrolyte membrane.

The support 21 may include one or more of titanium nitride, and titanium oxide ($TiO_2$). Preferably, the support 21 may include titanium nitride in an inner portion 21a thereof, and may include titanium oxide in at least a portion of a surface 21b thereof. However, this does not mean that the inner portion 21a is composed of only titanium nitride, and the surface 21b is composed of only titanium oxide. Titanium oxide may also be included in the inner portion 21a, and titanium nitride may also be included in the surface 21b. For example, when the support 21 is viewed as a whole, the inner portion 21a may include titanium nitride as a main component, and titanium oxide formed by oxidation of the titanium nitride may be included in at least a portion of the surface 21b.

The specific surface area of the support 21 is not particularly limited, but may be, for example, about 50 $m^2/g$ or greater or about 100 $m^2/g$. The specific surface area of the support 21 may be appropriately adjusted depending on the loading amount of the primary antioxidant and the loading amount of the secondary antioxidant.

The primary antioxidant is a material having radical scavenging ability, and may include one or more of cerium-based oxides and manganese-based oxides.

The content of the primary antioxidant in the dried electrolyte membrane may be about 3 $\mu g/cm^2$ to 35 $\mu g/cm^2$, or about 5 $\mu g/cm^2$ to 30 $\mu g/cm^2$. When the content of the primary antioxidant is less than about 3 $\mu g/cm^2$, the degree of improvement in chemical durability of the electrolyte membrane may be insignificant, and when the content of the primary antioxidant is greater than about 35 $\mu g/cm^2$, the hydrogen ion conductivity of the electrolyte membrane may decrease rapidly.

The secondary antioxidant is a material having hydrogen peroxide decomposition activity, and may include one or more selected from the group consisting of platinum (Pt), osmium (Os), iridium (Ir), gold (Au), palladium (Pd), silver (Ag), copper (Cu), nickel (Ni), cobalt (Co), titanium (Ti), and iron (Fe).

The crystal size of the secondary antioxidant may be about 5 nm to 20 nm, or about 8 nm to 15 nm. When the crystal size of the secondary antioxidant is less than about 5 nm, the secondary antioxidant may be eluted during the use of the electrolyte membrane, and thus the chemical durability of the electrolyte membrane may be degraded, and when the crystal size of the secondary antioxidant is greater than about 20 nm, the degree of improvement in the chemical durability of the electrolyte membrane may be insignificant for the amount of secondary antioxidant added.

The density of the secondary antioxidant in the dried electrolyte membrane may be about 2 $\mu g/cm^3$ to 4 $\mu g/cm^3$, or about 2.5 $\mu g/cm^3$ to 3.5 $\mu g/cm^3$. The "density of the secondary antioxidant" means a value obtained by dividing the content ($\mu g/cm^2$) of the secondary antioxidant by the thickness of the electrolyte membrane containing the secondary antioxidant. When the density of the secondary antioxidant is less than about 2 $\mu g/cm^3$, the effect of increasing the open circuit voltage of the membrane-electrode assembly may be insignificant, and thus the effect of increasing the long-term chemical durability of the electrolyte membrane may not be significant, and when the density of the secondary antioxidant is greater than about 4 $\mu g/cm^3$, a problem may arise in that the overcrowding of the conductive material causes a decrease in open circuit voltage and a decrease in hydrogen ion conductivity.

Figure 3:
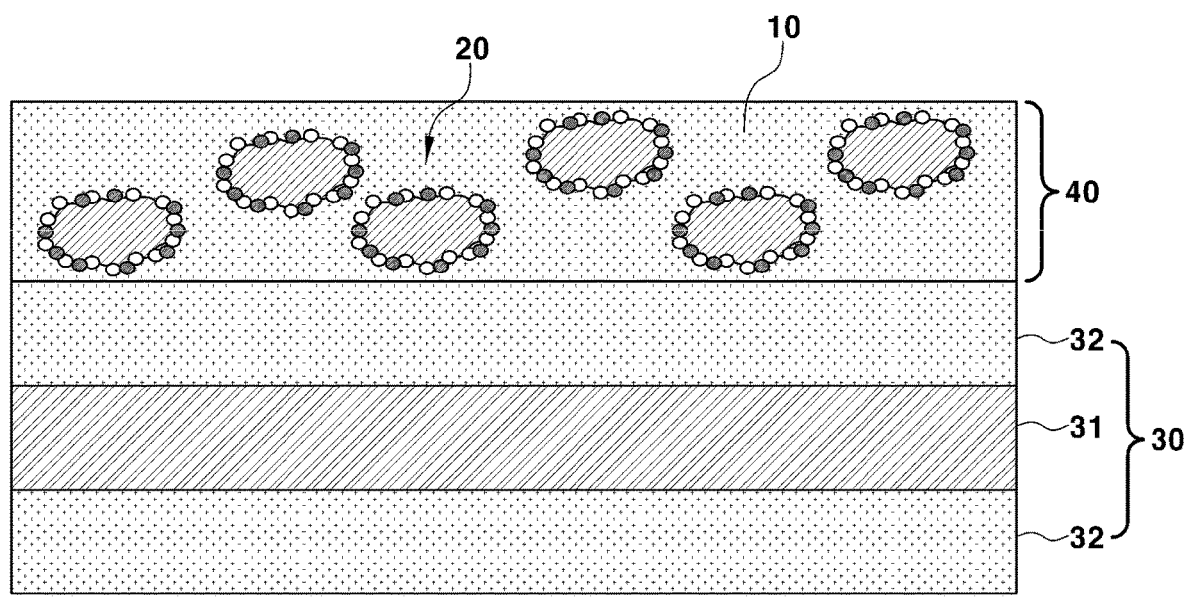
FIG. 3 shows an exemplary electrolyte membrane according to an exemplary embodiment of the present invention.

FIG. 3 is an exemplary electrolyte membrane according to an exemplary embodiment of the present invention. The electrolyte membrane may include: a composite membrane 30 including a reinforcing layer 31 and an ion transport material 32 impregnated in the reinforcing layer 31; and an ion transport layer 40 formed on at least one surface of the composite membrane 30. The ion transport layer 40 includes the above-described ionomer 10 and complex 20.

The reinforcing layer 31 may increase the mechanical rigidity of the electrolyte membrane. Since the reinforcing layer 31 is a porous membrane including a plurality of pores, the ion transport material 32 may be impregnated therein.

The reinforcing layer 31 may include one or more selected from the group consisting of polytetrafluoroethylene (PTFE), expanded polytetrafluoroethylene (e-PTFE), polyethylene (PE), polypropylene (PP), polyphenylene oxide (PPO), polybenzimidazole (PBI), polyimide (PI), polyvinylidene fluoride (PVdF), and polyvinyl chloride (PVC).

The ion transport material 32 may be impregnated in the reinforcing layer 31 and transports hydrogen ions. As shown in FIG. 3, the ion transport material 32 may fill the inner pores of the reinforcing layer 31, and may further form a kind of layer having a predetermined thickness on both surfaces of the reinforcing layer 31. However, the ion transport material 32 may form a layer only on any one surface of the reinforcing layer 31, or may fill only the inner pores of the reinforcing layer 31 and may not form a layer on the outer surface of the reinforcing layer 31.

The ion transport material 32 may include any material capable of transporting hydrogen ions. In addition, the ion transport material 32 may be the same material as or different from the ionomer 10, but preferably may be the same perfluorinated sulfonic acid-based polymer as the ionomer 10.

Since the ionomer 10 and the complex 20 included in the ion transport layer 40 have been described above, the description thereof will be omitted below.

A method for producing an electrolyte membrane may include steps of: loading a secondary antioxidant having hydrogen peroxide decomposition activity on a support; obtaining a complex by loading a primary antioxidant having radical scavenging ability on the support having the secondary antioxidant loaded thereon; and producing an electrolyte membrane by applying a mixture obtained by dispersing the complex in an ionomer The method of loading the secondary antioxidant and the primary antioxidant on the support is not particularly limited, and may include any method widely used in the art to which the present invention pertains, such as a polyol synthesis method or a hydrothermal synthesis method.

The production method may further include a step of oxidizing the support, having the secondary antioxidant loaded thereon, by drying in an air atmosphere, before loading the primary antioxidant. Accordingly, the crystal size of the secondary antioxidant may be increased, and titanium oxide may be formed on at least a portion of the surface of the support including titanium nitride.

The drying may be performed at a temperature of about 60° C. to 100° C.

In addition, the drying may be performed for up to about 60 minutes from the time point when the secondary antioxidant ignites by reaction with atmospheric air. When the drying is terminated before the secondary antioxidant ignites, there may be no change in the surface of the titanium nitride, and thus the effect of improving the hydrogen ion conductivity of the electrolyte membrane may be insignificant, and when the drying time is greater than 60 minutes from the time point when the secondary antioxidant ignites, the particles of the secondary antioxidant may grow excessively or the titanium nitride may completely change into oxides, and thus the corrosion resistance and antioxidant properties of the electrolyte membrane may decrease.

Meanwhile, an ion transport layer may be formed by applying a mixture, obtained by dispersing the complex in an ionomer, to at least one surface of the composite membrane including the reinforcing layer and the ion transport material.

EXAMPLE

Hereinafter, the present invention will be described in more detail with reference to examples. The following examples are merely to help understand the present invention, and the scope of the present invention is not limited thereto.

Production Example

Titanium nitride having a specific surface area of about 50 $m^2/g$ was prepared as a support. A precursor of the secondary antioxidant platinum was mixed with a dispersion of the support, and the mixture was heated to a temperature of about 160° C. Then, the heated mixture was adjusted to a pH of 10 to 11 by addition of sodium hydroxide (NaOH) and allowed to react for 5 to 10 hours. Subsequently, the reaction mixture was adjusted to a pH of 2 to 3 by addition of a sulfuric acid solution and allowed to react. The resulting product was washed with distilled water and centrifuged to obtain powder. The powder was dried at a temperature of 80° C. in an air atmosphere. The powder consisted of platinum loaded on titanium nitride, and was dried for about 60 minutes from the time point when the platinum started to ignite by reaction with atmospheric air, thereby increasing the crystal size of the platinum and oxidizing the titanium nitride. The resulting product is hereinafter referred to as Pt/TiN-Oxidized.

Comparative Production Example

Similar to the Production Example above, platinum was loaded on titanium nitride.

However, the platinum loading process was controlled so that oxidation of the support did not occur. The resulting product is hereinafter referred to as Pt/TiN.

Experimental Example 1

Figure 4:
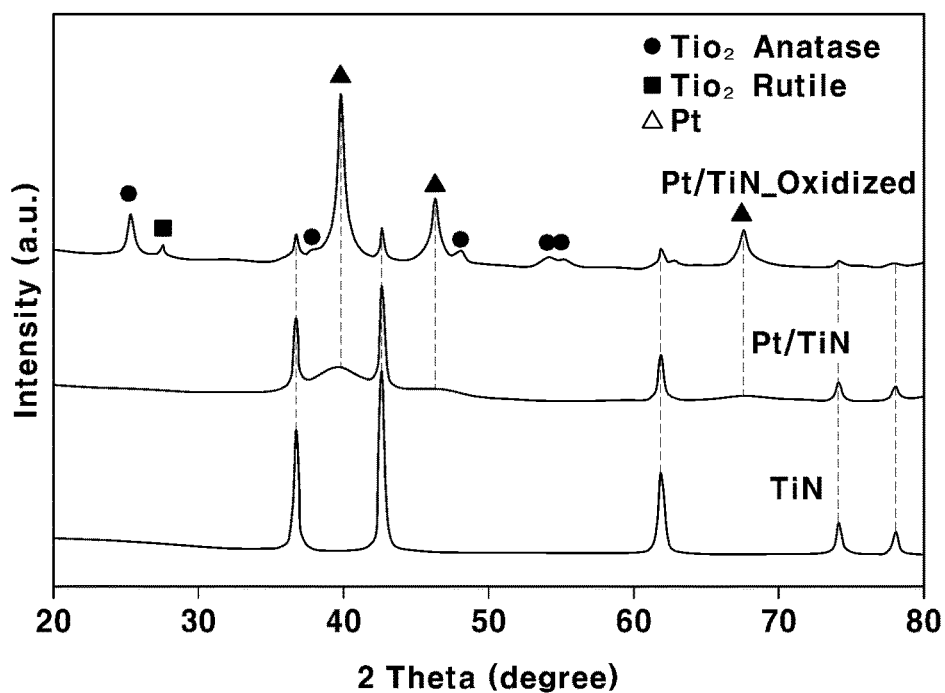
FIG. 4 shows the results of performing X-ray diffraction (XRD) analysis of the products of a Production Example and a Comparative Production Example.

X-ray diffraction (XRD) analysis of the products of the Production Example and the Comparative Production Example was performed. The results of the analysis are shown in FIG. 4, and in Pt/TiN-Oxidized of the Production Example, a peak attributable to titanium nitride, a peak attributable to a titanium oxide having an anatase crystal structure, and a peak attributable to a titanium oxide having a rutile crystal structure are all found.

Furthermore, the platinum crystal size of the Production Example, calculated based on the X-ray diffraction analysis results, was 11.6 nm, and the platinum crystal size of the Comparative Production Example was 3 nm.

Example 1 and Comparative Example 1

On the products of the Production Example and the Comparative Production Example, a primary antioxidant was loaded in the following manner. Each of the products was added to a dispersion of cerium precursor, and each mixture was subjected to a hydrothermal reaction at a temperature of about 100° C., dried, and then heat-treated at a temperature of about 180° C. for about 2 hours, thereby loading cerium oxide on each of the products.

Each of the complexes obtained as described above was added to and dispersed in a perfluorinated sulfonic acid-based ionomer. Each of the dispersions was applied onto a substrate, dried at a temperature of about 80° C. for 2 to 12 hours, and then heat-treated at a temperature of about 160°

C. for 5 minutes, thereby producing electrolyte membranes. The electrolyte membrane obtained using the product of the Production Example is defined as Example 1, and the electrolyte membrane obtained using the product of the Comparative Production Example is defined as Comparative Example 1.

Figure 5:
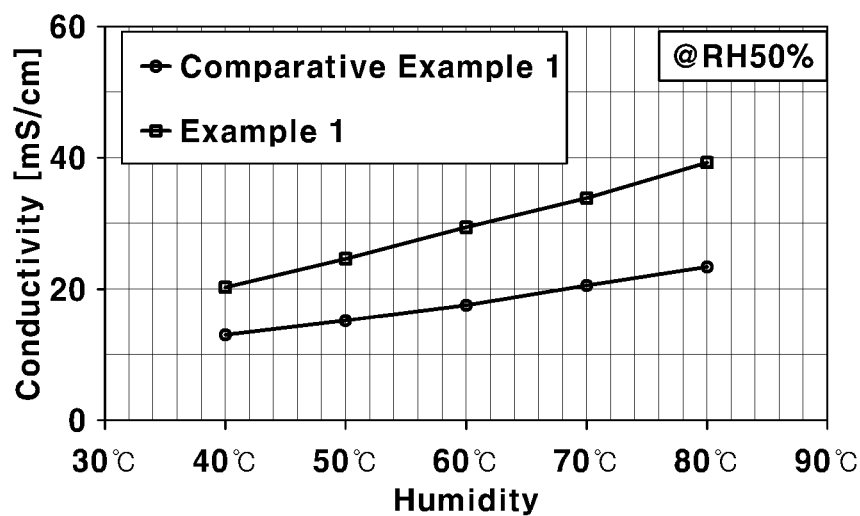
FIG. 5 shows the results of measuring the hydrogen ion conductivities of Example 1 and Comparative Example 1.

The hydrogen ion conductivities of Example 1 and Comparative Example 1 were measured. The hydrogen ion conductivities were measured in a temperature range from 40° C. to 80° C. under a relative humidity condition of 50%. The results of the measurement are shown in FIG. 5 and the hydrogen ion conductivity of Example 1 was higher than that of Comparative Example 1 over the entire temperature range. In particular, at a measurement temperature of 80° C., the hydrogen ion conductivity of Comparative Example 1 was 23.4 mS/cm$^2$, and the hydrogen ion conductivity of Example 1 significantly increased to 39.2 mS/cm$^2$.

Example 2 and Comparative Example 2

Each of the dispersions used in Example 1 and Comparative Example 1 was applied to and dried on a composite membrane including a reinforcing layer and an ion transport material impregnated therein, thus forming electrolyte membranes as shown in FIG. 3. These electrolyte membranes are defined as Example 2 and Comparative Example 2, respectively.

Figure 6:
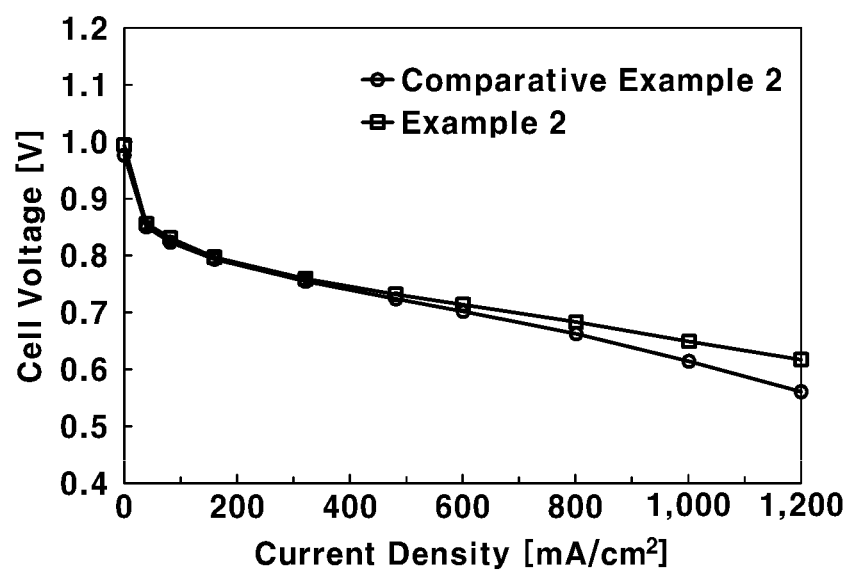
FIG. 6 shows the results of measuring the performances of Example 2 and Comparative Example 2.

Membrane-electrode assemblies were produced by forming electrodes on both surfaces of the electrolyte membranes of Example 2 and Comparative Example 2, and the performances thereof were measured. The results of the measurement are shown in FIG. 6. In addition, the physical properties of Example 2 and Comparative Example 2 are summarized in Table 1 below.

TABLE 1

| | Platinum content [mg/cm$^2$] | Platinum density [μg/cm$^3$] | Cerium content* [μg/cm$^2$] | Open circuit voltage [V] | Performance [V@1.0A/cm$^2$] |
|---|---|---|---|---|---|
| Comparative Example 2 | 0.019 | 1.9 | 35.3 | 0.977 | 0.614 |
| Example 2 | 0.022 | 2.8 | 16.3 | 0.996 | 0.649 |

*The cerium content refers to the content of cerium in cerium oxide.

The open circuit voltage (OCV) of Comparative Example 2 was 0.977 V, and the performance thereof at a current density of 1.0 A/cm$^2$ was measured to be 0.614 V. In addition, the open circuit voltage (OCV) of Example 2 was 0.996 V, and the performance thereof at a current density of 1.0 A/cm$^2$ was measured to be 0.649 V. It can be seen that, only when the density of platinum is higher than 2 μg/cm$^3$, the effect of increasing the open circuit voltage is clearly exhibited, and when the cerium content is more than about 17 μg/cm$^2$, the performance of the membrane-electrode assembly decreases rapidly.

Although the Experimental examples and Examples of the present invention have been described in detail above, the scope of the present invention is not limited to the above-described Experimental Examples and Examples, and various modifications and improvements made by those skilled in the art using the basic concept of the present invention as defined in the appended claims are also included in the scope of the present invention.

As described above, according to various exemplary embodiments of the present invention, an electrolyte membrane having improved hydrogen ion conductivity together with increased chemical durability may be provided by adding a complex loaded with a combination of a secondary antioxidant having hydrogen oxide decomposition activity and a primary antioxidant having radical scavenging ability.

According to various exemplary embodiments of the present invention, an electrolyte membrane having improved chemical durability may be obtained without reducing overall performance.

The effects of the present invention are not limited to the above-mentioned effects. It is to be understood that the effects of the present invention include all effects that may be deduced from the above description.

What is claimed is:

1. An electrolyte membrane for a membrane-electrode assembly, comprising:
   an ionomer having hydrogen ion conductivity; and
   a complex dispersed in the ionomer,
   wherein the complex comprises:
   a support;
   a primary antioxidant loaded on the support and having radical scavenging ability; and
   a secondary antioxidant loaded on the support and having hydrogen peroxide decomposition activity.

2. The electrolyte membrane of claim 1, wherein the support comprises one or more of titanium nitride, and titanium oxide.

3. The electrolyte membrane of claim 1, wherein the support comprises titanium nitride in an inner portion thereof, and comprises titanium oxide on at least a portion of a surface thereof.

4. The electrolyte membrane of claim 1, wherein the support has an X-ray diffraction (XRD) pattern in which a peak attributable to titanium nitride, a peak attributable to a titanium oxide having an anatase crystal structure, and a peak attributable to a titanium oxide having a rutile crystal structure are found.

5. The electrolyte membrane of claim 1, wherein the primary antioxidant comprises one or more of cerium-based oxides and manganese-based oxides.

6. The electrolyte membrane of claim 1, wherein a content of the primary antioxidant is about 3 μg/cm$^2$ to 35 μg/cm$^2$.

7. The electrolyte membrane of claim 1, wherein the secondary antioxidant comprises one ore more selected from the group consisting of platinum (Pt), osmium (Os), iridium (Ir), gold (Au), palladium (Pd), silver (Ag), copper (Cu), nickel (Ni), cobalt (Co), titanium (Ti), and iron (Fe).

8. The electrolyte membrane of claim 1, wherein the secondary antioxidant has a crystal size of about 5 nm to 20 nm.

9. The electrolyte membrane of claim 1, wherein the secondary antioxidant has a density of about 2 μg/cm$^3$ to 4 μg/cm$^3$.

10. The electrolyte membrane of claim 1, further comprising a composite membrane comprising a reinforcing layer and an ion transport material impregnated in the reinforcing layer, wherein an ion transport layer formed on at least one surface of the composite membrane comprises the ionomer and the complex.

11. A fuel cell comprising the electrolyte membrane of claim 1.

12. A water electrolysis device comprising the electrolyte membrane of claim 1.

13. A method for producing an electrolyte membrane for a membrane-electrode assembly, comprising:
    loading a secondary antioxidant having hydrogen peroxide decomposition activity on a support;

obtaining a complex by loading a primary antioxidant having radical scavenging ability on the support having the secondary antioxidant loaded thereon; and producing an electrolyte membrane by applying a mixture obtained by dispersing the complex in an ionomer.

14. The method of claim 13, wherein the support comprises titanium nitride, and before the primary antioxidant is loaded, the support having the secondary antioxidant loaded thereon is oxidized by drying in an air atmosphere.

15. The method of claim 14, wherein the support oxidized comprises titanium nitride in an inner portion thereof, and comprises titanium oxide on at least a portion of a surface thereof.

16. The method of claim 14, wherein the drying is performed at a temperature of about 60° C. to 100° C.

17. The method of claim 14, wherein the drying is performed for up to about 60 minutes from a time point when the secondary antioxidant reacts with atmospheric air.

18. The method of claim 13, wherein an ion transport layer is formed by applying the mixture to at least one surface of a composite membrane comprising a reinforcing layer and an ion transport material impregnated in the reinforcing layer.

\* \* \* \* \*